(12) United States Patent
Nakajima et al.

(10) Patent No.: US 9,910,545 B2
(45) Date of Patent: Mar. 6, 2018

(54) TRANSPARENT CONDUCTIVE FILM AND TOUCH PANEL

(75) Inventors: Kazuhiro Nakajima, Ibaraki (JP); Tomotake Nashiki, Ibaraki (JP); Hideo Sugawara, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 1562 days.

(21) Appl. No.: 12/503,395

(22) Filed: Jul. 15, 2009

(65) Prior Publication Data

US 2010/0013798 A1      Jan. 21, 2010

(30) Foreign Application Priority Data

Jul. 18, 2008  (JP) ................. 2008-187438

(51) Int. Cl.
G06F 3/044 (2006.01)
G02B 5/22 (2006.01)
B32B 3/00 (2006.01)

(52) U.S. Cl.
CPC .................... G06F 3/044 (2013.01)

(58) Field of Classification Search
CPC .... G06F 3/044; G06F 3/0488; G06F 3/04883; B32B 3/00; B32B 2307/202; B32B 2307/412; Y10T 428/2495; Y10T 428/24967
USPC ..... 428/195.1, 201, 203, 212; 345/173, 176; 359/885
See application file for complete search history.

(56) References Cited

U.S. PATENT DOCUMENTS

| | | |
|---|---|---|
| 6,686,249 B1 | 2/2004 | Yukinobu et al. |
| 2003/0094296 A1 | 5/2003 | Kojima et al. |
| 2003/0152787 A1 | 8/2003 | Arakawa et al. |
| 2005/0083307 A1* | 4/2005 | Aufderheide et al. ........ 345/173 |
| 2005/0153117 A1* | 7/2005 | Suzuki et al. ................ 428/212 |
| 2006/0013967 A1* | 1/2006 | Mikoshiba .......... G02F 1/13338 428/1.1 |

(Continued)

FOREIGN PATENT DOCUMENTS

| | | |
|---|---|---|
| JP | 06-222352 A | 8/1994 |
| JP | 2002-083518 A | 3/2002 |

(Continued)

OTHER PUBLICATIONS

Japanese Office Action dated Dec. 4, 2012, issued in corresponding Japanese Patent Application No. 2008-187438, with English translation (6 pages).

(Continued)

Primary Examiner — Joanna Pleszczynska
(74) Attorney, Agent, or Firm — Westerman, Hattori, Daniels & Adrian, LLP

(57) ABSTRACT

The transparent conductive film of the present invention is a transparent conductive film, comprising: a transparent film substrate; a patterned transparent conductive layer formed on one side of the transparent film substrate; and a colored layer provided on at least one of an opposite side of the transparent conductive layer from the transparent film substrate and an opposite side of the transparent film substrate from the transparent conductive layer, wherein the colored layer has an average absorptance of from 35% to 90% for light in the wavelength range of from 380 nm to 780 nm.

8 Claims, 2 Drawing Sheets

(56) References Cited

U.S. PATENT DOCUMENTS

| | | | |
|---|---|---|---|
| 2006/0035073 A1* | 2/2006 | Funkenbusch | H05K 9/0094 428/336 |
| 2007/0091074 A1* | 4/2007 | Nashiki et al. | 345/173 |
| 2007/0236618 A1 | 10/2007 | Maag et al. | |
| 2008/0138589 A1 | 6/2008 | Wakabayashi et al. | |
| 2008/0152879 A1 | 6/2008 | Nashiki et al. | |
| 2009/0104440 A1* | 4/2009 | Nashiki | C08J 7/045 428/336 |

FOREIGN PATENT DOCUMENTS

| | | |
|---|---|---|
| JP | 2002-311233 A | 10/2002 |
| JP | 2002-311843 A | 10/2002 |
| JP | 2003-23290 A | 1/2003 |
| JP | 2003-86991 A | 3/2003 |
| JP | 2003-187643 A | 7/2003 |
| JP | 2005-157543 A | 6/2005 |
| JP | 2008-146927 A | 6/2008 |
| WO | 2006/126604 A1 | 11/2006 |
| WO | 2007/115032 A2 | 10/2007 |

OTHER PUBLICATIONS

Japanese Office Action dated Oct. 8, 2013, issued in corresponding Japanese Patent Application No. 2008-187438, w/ English translation.

Japanese Office Action dated Aug. 6, 2013, issued in counterpart Japanese Patent Application No. 2014-164699, w/ English translation (3 pages).

Decision of Refusal dated May 14, 2014, issued in Corresponding Japanese Patent Application No. 2008-187438, with English Translation (6 pages).

* cited by examiner

[Fig. 1]
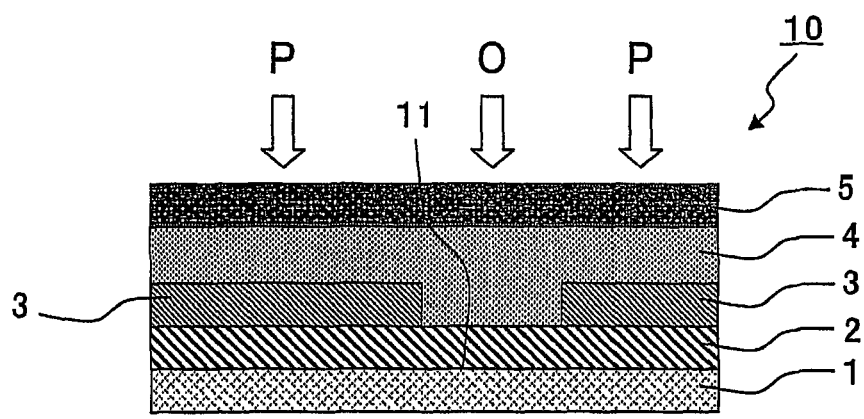
[Fig. 2]
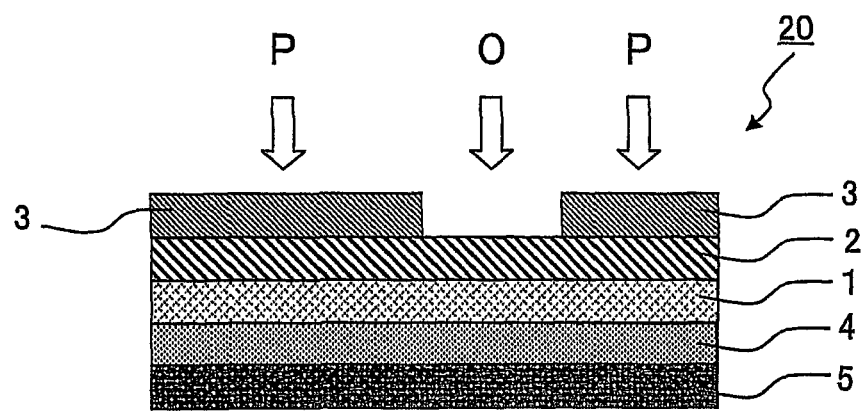

[Fig. 3]
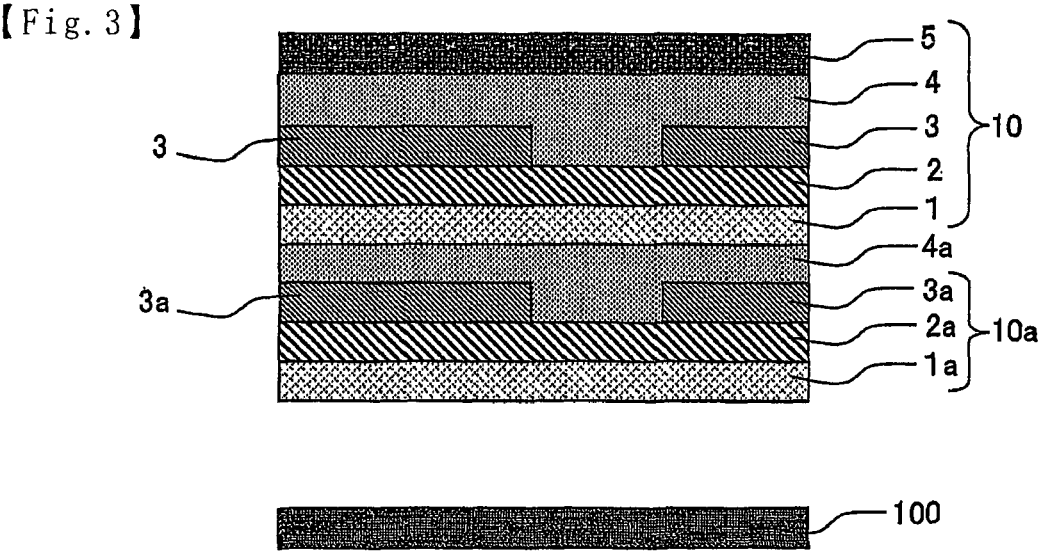

TRANSPARENT CONDUCTIVE FILM AND TOUCH PANEL

BACKGROUND OF THE INVENTION

Field of the Invention

The invention relates to a transparent conductive film and a touch panel therewith.

Description of the Related Art

Concerning conventional transparent conductive components, the so-called conductive glass is well known, which includes a glass member and an indium oxide thin film formed thereon. Since the base member of the conductive glass is made of glass, however, it has low flexibility or workability and cannot preferably be used in some applications. In recent years, therefore, transparent conductive films using various types of plastic films such as polyethylene terephthalate films as their substrates have been used, because of their advantages such as good impact resistance and light weight as well as flexibility and workability, and used for applications requiring transparency, such as touch panels.

Japanese Patent Application Laid-Open (JP-A) No. 2005-157543 discloses an invention directed to a resistive film type touch panel as an example of the touch panel. According to Japanese Patent Application Laid-Open (JP-A) No. 2005-157543, a colored substrate is used to reduce the reflection of external light at the interface between the substrate and the conductive layer and at the interface between the conductive layer and the air so that the display on the display device can be made readily visible.

On the other hand, concerning touch panels enabling multipoint input, capacitive touch panels have attracted attention in recent years. Such capacitive touch panels generally use a transparent conductive film including a transparent conductive layer having a predetermined pattern.

SUMMARY OF THE INVENTION

However, such a patterned transparent conductive layer may produce a clear difference between the patterned portion and the non-patterned portion (pattern opening portion) so that a poor appearance may be given. Specifically, when external light from the viewer side is reflected on the transparent conductive layer or when internal light from the display device side is transmitted through the transparent conductive layer, the patterned portion and the non-patterned portion may be made clearly visible so that a poor appearance may be produced. Therefore, there has been a demand for a transparent conductive film that has a good appearance even when its transparent conductive layer is patterned.

The invention provides a transparent conductive film having a patterned transparent conductive layer in which the difference between the pattern portion and the pattern opening portion is reduced so that a good appearance is provided. The invention also provides a touch panel using such a transparent conductive film.

The transparent conductive film of the present invention is a transparent conductive film, comprising: a transparent film substrate; a patterned transparent conductive layer formed on one side of the transparent film substrate; and a colored layer provided on at least one of an opposite side of the transparent conductive layer from the transparent film substrate and an opposite side of the transparent film substrate from the transparent conductive layer, wherein the colored layer has an average absorptance of from 35% to 90% for light in the wavelength range of from 380 nm to 780 nm.

The transparent conductive film of the invention is provided with a colored layer having an average absorptance of from 35 to 90% for light in the wavelength range of from 380 to 780 nm so that the reflectance of external light from the viewer side or the transmittance of internal light from the display device side is reduced. In this mechanism, the reflectance or the transmittance is reduced with respect to both the pattern portion and the pattern opening portion in the transparent conductive layer, so that the difference in reflectance between the pattern portion and the pattern opening portion or the difference in transmittance between the pattern portion and the pattern opening portion is also reduced. Therefore, the difference in transmittance between the pattern portion and the pattern opening portion is reduced, so that a transparent conductive film having a good appearance is provided.

In the above, it is preferable that the absorptance of the colored layer for light in the wavelength range of from 380 nm to 780 nm has a standard deviation of less than 20%. In this case, the colored layer has an almost constant absorptance over the visible light region, so that the difference in the color ($\Delta E$) of reflected light or transmitted light between the pattern portion and the pattern opening portion can be reduced, which makes it possible to further reduce the difference between the pattern portion and the pattern opening portion.

In the above, it is preferable that the transparent conductive film further comprises a transparent dielectric layer provided between the transparent film substrate and the transparent conductive layer. According to this feature, bleeding out of low-molecular-weight components from the transparent film substrate can be suppressed. In this case, the relation $n2<n1<n3$ is preferably satisfied, wherein $n1$ is the refractive index of the transparent film substrate, $n2$ is the refractive index of the transparent dielectric layer, and $n3$ is the refractive index of the transparent conductive layer, so that the difference in reflectance or transmittance between the pattern portion and the pattern opening portion can be effectively reduced. In an embodiment of the invention, the refractive index is determined for light at a wavelength of 589.3 nm.

In the above, it is preferable that the transparent film substrate has a thickness of from 2 µm to 200 µm. According to this feature, a relatively thin film can be easily produced, while a certain mechanical strength can be ensured.

The transparent conductive film of the invention is suitable for use in touch panels based on various detection methods and particularly suitable for use in capacitive touch panels. Capacitive touch panels generally use a patterned transparent conductive layer to improve input accuracy or enable multipoint input. In such capacitive tough panels, therefore, the function according to the invention (the function of reducing the difference between the pattern portion and the pattern opening portion) is more effectively performed.

The invention is also directed to a touch panel including the transparent conductive film of the invention stated above. The touch panel of the invention can produce the same advantageous effect as the transparent conductive film of the invention.

In the above, it is preferable that the colored layer of the transparent conductive film is located on a viewer side. In this case, reflectance of external light from the viewer side can be particularly reduced, so that the function of reducing the difference between the pattern portion and the pattern opening portion can be more effectively performed.

BRIEF DESCRIPTION OF THE DRAWINGS

FIG. 1 is a cross-sectional view of a transparent conductive film according to a first embodiment of the invention;

FIG. 2 is a cross-sectional view of a transparent conductive film according to a second embodiment of the invention; and FIG. 3 is a schematic cross-sectional view of a capacitive touch panel using the transparent conductive film according to the first embodiment.

DETAILED DESCRIPTION OF THE PREFERRED EMBODIMENTS

Embodiments of the invention are described below with reference to the drawings. In the drawings, the same elements are represented by the same reference characters, and undue duplication of the description will be avoided.

First Embodiment

FIG. 1 is a cross-sectional view of a transparent conductive film according to a first embodiment of the invention. Referring to FIG. 1, the transparent conductive film 10 includes a transparent film substrate 1, and a transparent dielectric layer 2 and a transparent conductive layer 3 that are sequentially formed on one side of the transparent film substrate 1. A colored layer 5 is also provided on the opposite side of the transparent conductive layer 3 from the transparent dielectric layer 2 with a transparent pressure-sensitive adhesive layer 4 interposed therebetween. The colored layer 5 has an average absorptance of from 35 to 90% for light in the wavelength range of from 380 to 780 nm. The relation n2<n1<n3 is also satisfied, wherein n1 is the refractive index of the transparent film substrate 1, n2 is the refractive index of the transparent dielectric layer 2, and n3 is the refractive index of the transparent conductive layer 3. The transparent conductive layer 3 is also patterned to form a pattern portion P and a pattern opening portion O.

The transparent conductive film 10 provided with the colored layer 5 having an average absorptance of from 35 to 90% for light in the wavelength range of from 380 to 780 nm makes it possible to reduce reflectance of external light from the viewer side or transmittance of internal light from the display device side (not shown). In this mechanism, the reflectance or the transmittance is reduced with respect to both the pattern portion P and the pattern opening portion O in the transparent conductive layer 3, so that the difference in reflectance between the pattern portion P and the pattern opening portion O or the difference in transmittance between the pattern portion P and the pattern opening portion O is also reduced. Therefore, the difference between the pattern portion P and the pattern opening portion O is reduced.

There is no particular limitation to the transparent film substrate 1, and various types of plastic films having transparency may be used. Examples of the material for the transparent film substrate 1 include polyester resins, acetate resins, polyethersulfone resins, polycarbonate resins, polyamide resins, polyimide resins, polyolefin resins, (meth) acrylic resins, polyvinyl chloride resins, polyvinylidene chloride resins, polystyrene resins, polyvinyl alcohol resins, polyarylate resins, and polyphenylene sulfide resins. In particular, polyester resins, polycarbonate resins, and polyolefin resins are preferred.

Examples thereof also include polymer films as disclosed in JP-A No. 2001-343529 (WO01/37007) and a resin composition that contains a thermoplastic resin having a side chain of a substituted and/or unsubstituted imide group and a thermoplastic resin having a side chain of substituted and/or unsubstituted phenyl and nitrile groups. Specifically, a polymer film of a resin composition containing an alternating copolymer made of isobutylene and N-methylmaleimide, and an acrylonitrile-styrene copolymer may be used.

The transparent film substrate 1 preferably has a refractive index of from 1.50 to 1.70, more preferably from 1.53 to 1.70. In this case, the difference in reflectance between the pattern portion P and the pattern opening portion O, and the difference in transmittance between the pattern portion P and the pattern opening portion O can be more effectively reduced.

The transparent film substrate 1 preferably has a thickness of from 2 to 200 µm, more preferably from 2 to 100 µm. In this range, a relatively thin film can be easily produced, while a certain mechanical strength can be ensured.

The surface of the transparent film substrate 1 may be previously subject to sputtering, corona discharge treatment, flame treatment, ultraviolet irradiation, electron beam irradiation, chemical treatment, etching treatment such as oxidation, or undercoating treatment such that the adhesion of the transparent dielectric layer 2 formed thereon to the transparent film substrate 1 can be improved. If necessary, the transparent film substrate 1 may also be subjected to dust removing or cleaning by solvent cleaning, ultrasonic cleaning or the like, before the transparent dielectric layer 2 is formed.

The transparent dielectric layer 2 may be made of an inorganic material, an organic material or a mixture of an inorganic material and an organic material. Examples of the inorganic material include NaF (1.3), $Na_3AlF_6$ (1.35), LiF (1.36), $MgF_2$ (1.38), $CaF_2$ (1.4), $BaF_2$ (1.3), $SiO_2$ (1.46), $LaF_3$ (1.55), $CeF_3$ (1.63), and $Al_2O_3$ (1.63), wherein each number inside the parentheses is the refractive index of each material. In particular, $SiO_2$, $MgF_2$, $Al_2O_3$, or the like is preferably used. Besides the above, a complex oxide containing at least indium oxide and cerium oxide may also be used. Examples of the organic material include acrylic resins, urethane resins, melamine resins, alkyd resins, siloxane polymers, and organosilane condensates.

The refractive index of the transparent dielectric layer 2 is preferably from 1.30 to 1.65, more preferably from 1.40 to 1.60 so that the difference in reflectance or transmittance between the pattern portion P and the pattern opening portion O can be more effectively reduced.

The thickness of the transparent dielectric layer 2 is preferably in the range of from 15 to 55 nm, more preferably in the range of from 20 to 50 nm. In this range, the difference in reflectance or transmittance between the pattern portion P and the pattern opening portion O can be more effectively reduced.

The transparent dielectric layer 2 provided between the transparent film substrate 1 and the transparent conductive layer 3 does not function as a conductive layer. In other words, the transparent dielectric layer 2 is provided as a dielectric layer capable of insulating pattern portions P of the transparent conductive layer 3 from one another. Therefore, the transparent dielectric layer 2 typically has a surface resistance of $1\times10^6$ Ω/square or more, preferably $1\times10^7$ Ω/square or more, more preferably $1\times10^8$ Ω/square or more. The surface resistance of the transparent dielectric layer 2 does not have any particular upper limit. While the surface resistance of the transparent dielectric layer 2 may generally has an upper limit of about $1 \times 10^{13}$ Ω/square, which corresponds to a measuring limit, it may be higher than $1 \times 10^{13}$ Ω/square.

The transparent dielectric layer 2 also has the function of suppressing bleeding out of low-molecular-weight components such as oligomer components from the transparent film substrate 1. If the patterned transparent conductive layer 3 is formed directly on the transparent film substrate 1, the low-molecular-weight components may bleed out of the surface 11 (see FIG. 1) of the transparent film substrate 1 immediately below the pattern opening portion O. In this case, the difference between the pattern portion P and the pattern opening portion O may become clear. In this embodiment, the transparent dielectric layer 2 is placed between the transparent film substrate 1 and the transparent conductive layer 3 so that bleeding out of the low-molecular-weight components is suppressed, which makes it possible to effectively reduce the difference between the pattern portion P and the pattern opening portion O.

While a single transparent dielectric layer is provided in this embodiment, the invention is not limited to this type of configuration, and a plurality of transparent dielectric layers may be provided, as long as the effects of the invention are not impaired. For example, another transparent dielectric layer with a refractive index of about 2.0 to about 2.3 may be provided between the transparent film substrate 1 and the transparent dielectric layer 2. In another embodiment of the invention, the transparent conductive layer may be formed directly on the transparent film substrate with no transparent dielectric layer.

Examples of materials that may be used to form the transparent conductive layer 3 include, but are not limited to, oxides of at least one metal (or semimetal) selected from the group consisting of indium, tin, zinc, gallium, antimony, titanium, silicon, zirconium, magnesium, aluminum, gold, silver, copper, palladium, and tungsten. Such oxides may be optionally added with any metal atom selected from the above group or any oxide thereof. For example, indium oxide containing with tin oxide or tin oxide containing with antimony is preferably used.

The refractive index of the transparent conductive layer 3 is preferably from 1.75 to 2.10, more preferably from 1.90 to 2.10, in order to more effectively reduce the difference in reflectance or transmittance between the pattern portion P and the pattern opening portion O.

The thickness of the transparent conductive layer 3 is preferably in the range of from 10 to 50 nm, more preferably from 15 to 50 nm. In this range, the difference in reflectance or transmittance between the pattern portion P and the pattern opening portion O can be more effectively reduced, while transparency and conductivity are ensured.

The colored layer 5 may be made of any material capable of absorbing light in part of the visible light region. For example, a resin composition containing the transparent film substrate 1-forming material and a material capable of absorbing visible light, such as a pigment or a dye, may be used to form the colored layer 5. Examples of the method for forming the colored layer 5 include, but are not limited to, a method of bonding a colored film made of the resin composition onto the transparent conductive layer 3 with the transparent pressure-sensitive adhesive layer 4 interposed therebetween and a method including applying a coating liquid including the resin composition to the transparent conductive layer 3 and drying the coating. The latter method does not need the transparent pressure-sensitive adhesive layer 4.

The average absorptance of the colored layer 5 is preferably 40% or more in order to further reduce the difference in reflectance or transmittance between the pattern portion P and the pattern opening portion O. On the other hand, it is preferably 75% or less in order that, when the film is used in a touch panel, the display on the display device may be made readily visible.

The standard deviation of the absorptance of the colored layer 5 for light in the wavelength range of from 380 to 780 nm is preferably less than 20%, more preferably 19% or less. In this case, the colored layer 5 has an almost constant absorptance over the visible light region, so that the difference in the color (ΔE) of reflected light or transmitted light between the pattern portion P and the pattern opening portion O can be reduced, which makes it possible to further reduce the difference between the pattern portion P and the pattern opening portion O.

The thickness of the colored layer 5 is preferably in the range of from 1 to 2,000 μm, more preferably in the range of from 1 to 1,000 μm, in order to more effectively reduce the difference in reflectance or transmittance between the pattern portion P and the pattern opening portion O at such a level that the visibility of the display on the display device is not impaired, while it may be appropriately determined depending on the visible light absorptance of the layer forming material.

In this embodiment, the colored layer 5 is provided on the transparent conductive layer 3 with the transparent pressure-sensitive adhesive layer 4 interposed therebetween. Any transparent pressure-sensitive adhesive may be used for the transparent pressure-sensitive adhesive layer 4 without limitation. For example, the pressure-sensitive adhesive may be appropriately selected from transparent adhesives based on polymers such as acrylic polymers, silicone polymers, polyester, polyurethane, polyamide, polyvinyl ether, vinyl acetate-vinyl chloride copolymers, modified polyolefins, epoxy polymers, fluoropolymers, and rubbers such as natural rubbers and synthetic rubbers. In particular, acrylic pressure-sensitive adhesives are preferably used, because they have good optical transparency and good weather or heat resistance and exhibit suitable wettability and adhesion properties such as cohesiveness and adhesiveness.

The transparent pressure-sensitive adhesive layer 4 is generally made from a pressure-sensitive adhesive solution (with a solids content of about 10 to about 50% by weight) containing a base polymer or a composition thereof dissolved or dispersed in a solvent. The solvent to be used may be appropriately selected from an organic solvent such as toluene or ethyl acetate or water or the like depending on the type of the pressure-sensitive adhesive.

The refractive index of the transparent pressure-sensitive adhesive layer 4 is preferably between the reflectances of the transparent conductive layer 3 and the colored layer 5 in order to more effectively reduce the difference in reflectance or transmittance between the pattern portion P and the pattern opening portion O.

An illustrative method for producing the transparent conductive film 10 typically includes the steps of forming the transparent dielectric layer 2 and the transparent conductive layer 3 on one side of the transparent film substrate 1 in this order from the transparent film substrate 1 side and patterning the transparent conductive layer 3 by etching with acid.

Examples of methods for forming each of the transparent dielectric layer 2 and the transparent conductive layer 3 include a vacuum deposition method, a sputtering method, an ion plating method, and so on, while any appropriate method may be used depending on the type of the material and the desired thickness.

In the etching, the transparent conductive layer 3 may be covered with a patterning mask and etched with an acid. The acid may be an inorganic acid such as hydrochloric acid, hydrobromic acid, sulfuric acid, nitric acid, or phosphoric acid, an organic acid such as acetic acid, any mixture thereof, or an aqueous solution of any of the foregoing.

After the transparent conductive layer 3 is patterned, if necessary, the patterned transparent conductive layer 3 may be subjected to heat treatment. In this case, the component of the transparent conductive layer 3 can be crystallized so that the transparency and the conductivity can be improved. In this treatment, the heating temperature is typically in the range of from 100 to 180° C., and the treatment time is typically in the range of from 15 to 180 minutes.

The transparent conductive layer 3 may be patterned in any of various forms such as stripes depending on the intended use of the transparent conductive film 10.

Second Embodiment

Next, a description is given of a transparent conductive film according to a second embodiment of the invention. FIG. 2 is a cross-sectional view of the transparent conductive film according to the second embodiment of the invention. Referring to FIG. 2, the transparent conductive film 20 includes a transparent film substrate 1, a transparent dielectric layer 2, and a colored layer 5 placed on the opposite side of the transparent film substrate 1 from the transparent dielectric layer 2 with a transparent pressure-sensitive adhesive layer 4 interposed therebetween. The other features of the transparent conductive film 20 are the same as those of the transparent conductive film 10. Therefore, the transparent conductive film 20 also produces the same advantageous effects as the transparent conductive film 10.

While transparent conductive films according to some embodiments of the invention have been described, the embodiments of the invention are not limited to those described above. For example, colored layers may be provided on both the opposite side of the transparent conductive layer from the transparent dielectric layer and the opposite side of the transparent film substrate from the transparent dielectric layer, although a colored layer is provided on one side in the above embodiments. In addition, the transparent conductive film of the invention may be optionally provided with an anti-glare or anti-reflection layer to improve visibility or a hard coat layer or the like.

Next, a description is given of an embodiment where the transparent conductive film of the invention is used for a touch panel. FIG. 3 is a schematic cross-sectional view of a capacitive touch panel using the transparent conductive film 10 according to the first embodiment. Referring FIG. 3, a transparent conductive film 10 and another transparent conductive film 10a are laminated with a transparent pressure-sensitive adhesive layer 4a interposed therebetween, and a colored layer 5 is provided on the viewer side (opposite to a display device 100). The transparent conductive film 10a may have the same structure as the transparent conductive film 10, except that it does not have the transparent pressure-sensitive adhesive layer 4 and the colored layer 5. The transparent pressure-sensitive adhesive layer 4a may be made of the same material as the transparent pressure-sensitive adhesive layer 4 described above. The touch panel of FIG. 3 having the structure described above makes it possible to reduce reflectance of external light from the viewer side or transmittance of internal light from the display device 100 side. In this mechanism, the reflectance and the transmittance are reduced with respect to both the pattern portion and the pattern opening portion in the transparent conductive layer 3, so that the difference in reflectance between the pattern portion and the pattern opening portion and the difference in transmittance between the pattern portion and the pattern opening portion are also reduced. Therefore, the difference between the pattern portion and the pattern opening portion is reduced.

While an example of the touch panel of the invention has been described, the touch panel of the invention is not limited to that according to the embodiment described above, as long as the transparent conductive film of the invention is used. For example, the transparent conductive film 20 described above may be used in place of the transparent conductive film 10. In the touch panel of FIG. 3, each of the pattern portion and the pattern opening portion of the transparent conductive layer 3 coincides with each of the pattern portion and the pattern opening portion of the transparent conductive layer 3a. However, these portions do not have to coincide with each other, and both sides may be differently patterned as needed.

EXAMPLES

Some examples of the invention are described below together with some comparative examples. It will be understood that the invention should not be interpreted as being limited to the examples described below.

Refractive Index of Each Layer

The refractive index of each layer was measured with an Abbe refractometer manufactured by Atago Co., Ltd. according to the measurement method specified for the refractometer, while a measurement light beam was applied to the surface of each object being measured.

Thickness of Each Layer

The thickness of the transparent film substrate and the colored film were measured with a microgauge type thickness gauge manufactured by Mitutoyo Corporation. The thicknesses of other layers were measured by observing their cross-sections with a transmission electron microscope H-7650 manufactured by Hitachi, Ltd.

Optical Properties of Colored Film

The absorbance (Abs) for light in the wavelength range of from 380 to 780 nm was measured at intervals of 5 nm using a spectrophotometer manufactured by Hitachi High-Technologies Corporation (U-4100). The light source used was a halogen lamp with an irradiation intensity of 50 W/m$^2$, and the measurement was performed at a scanning speed of 600 nm/minute. The absorbance (Abs) at each wavelength was then converted into an absorptance according to the formula below. The average and standard deviation of the resulting absorptances were then calculated, which are shown as "average absorptance" and "standard deviation," respectively, in Table 1 described later. The L*, a* and b* values of the transmitted light were calculated using a D65 light source. Absorptance (%)=100−(10$^{-Abs}$×100)

Example 1

Formation of Transparent Dielectric Layer

A 35 nm-thick transparent dielectric layer (with a refractive index n2 of 1.54) was formed by a process including applying a thermosetting resin composed of a melamine resin, an alkyd resin and an organosilane condensate (2:2:1 in weight ratio) to one side of a transparent film substrate (with a refractive index n1 of 1.65) made of a 23 μm-thick polyethylene terephthalate film (hereinafter referred to as "PET film") and curing the resin.

Formation of Transparent Conductive Layer

A 22 nm-thick ITO film (with a refractive index n3 of 2.00) was formed as a transparent conductive layer on the transparent dielectric layer by a reactive sputtering method under a mixed gas atmosphere of 95% argon gas and 5% oxygen gas (0.5 Pa) using a sintered material of 97% by weight of indium oxide and 3% by weight of tin oxide.

Patterning of ITO Film by Etching

After a photoresist film having a stripe pattern was formed on the ITO film, the ITO film was etched by immersing it in a 5% by weight hydrochloric acid (aqueous hydrogen chloride solution) at 25° C. for 1 minute. The resulting ITO film had a pattern width of 5 mm and a pattern pitch of 1 mm.

Formation of Transparent Pressure-Sensitive Adhesive Layer and Colored Layer

A colored film 1 (1 mm in thickness, EB231-11 manufactured by Hikari Co., Ltd.) having the optical properties shown in Table 1 was then bonded to the patterned ITO film with a transparent pressure-sensitive adhesive layer (23 μm in thickness, 10 N/cm$^2$ in elastic modulus) interposed therebetween, so that a transparent conductive film of Example 1 was obtained. The material used to form the transparent pressure-sensitive adhesive layer was a mixture of 100 parts by weight of a copolymer of butyl acrylate, acrylic acid and vinyl acetate (100:2:5 in weight ratio) and 1 part by weight of an isocyanate cross-linking agent.

Example 2

A transparent conductive film of Example 2 was obtained using the process of Example 1, except that a colored film 2 (1 mm in thickness, EB231-9 manufactured by Hikari Co., Ltd.) having the optical properties shown in Table 1 was used in place of the colored film 1.

Example 3

A transparent conductive film of Example 3 was obtained using the process of Example 1, except that the transparent dielectric layer was not formed.

Example 4

A transparent conductive film of Example 4 was obtained using the process of Example 2, except that the transparent dielectric layer was not formed.

Comparative Example 1

A transparent conductive film of Comparative Example 1 was obtained using the process of Example 1, except that the transparent pressure-sensitive adhesive layer and the colored film 1 were not formed.

Comparative Example 2

A transparent conductive film of Comparative Example 2 was obtained using the process of Example 3, except that the transparent pressure-sensitive adhesive layer and the colored film 1 were not formed.

Comparative Example 3

A transparent conductive film of Comparative Example 3 was obtained using the process of Example 3, except that a colored film 3 (1 mm in thickness, EB231-10 manufactured by Hikari Co., Ltd.) having the optical properties shown in Table 1 was used in place of the colored film 1.

Comparative Example 4

A transparent conductive film of Comparative Example 4 was obtained using the process of Example 1, except that a colored film 3 (1 mm in thickness, EB231-10 manufactured by Hikari Co., Ltd.) having the optical properties shown in Table 1 was used in place of the colored film 1.

The transparent conductive films (samples) of the examples and the comparative examples were evaluated as described below. The results are shown in Table 2.

Reflection Characteristics

The reflectances of the pattern portion and the portion immediately below the pattern opening portion in the wavelength range of from 380 to 780 nm were measured at intervals of 5 nm using light incident on the ITO film at an angle of 2° and using a spectrophotometer manufactured by Hitachi High-Technologies Corporation (U-4100) in a measurement mode with an integrating sphere. The average reflectance of the pattern portion and the average reflectance of the portion immediately below the pattern opening portion were each calculated, and the difference in reflectance between the pattern portion and the portion immediately below the pattern opening portion was calculated from these average reflectance values. A light-blocking layer was formed on the back side (the PET film side) of the transparent conductive film (sample) using a black spray paint, and the measurement was performed under such conditions that reflection from the back side of the sample and incidence of light from the back side were almost prevented. The L*, a* and b* values of each of the pattern portion and the portion immediately below the pattern opening portion were calculated using a D65 light source, and the color difference (ΔE) between the reflected light from the pattern portion and the reflected light from the portion immediately below the pattern opening portion was calculated using the following formula:

$$\Delta E = \{(\Delta L^*)^2 + (\Delta a^*)^2 + (\Delta b^*)^2\}^{0.5}$$

Transmission Characteristics

While light in the wavelength range of from 380 to 780 nm was applied to the back side of the sample, the transmittance through the pattern portion and the transmittance through the pattern opening portion were each measured at intervals of 5 nm using a high-speed integrating-sphere spectral transmittance meter manufactured by Murakami Color Research Laboratory Co., Ltd. (DOT-3). The average transmittance through the pattern portion and the average transmittance through the pattern opening portion were each calculated, and the difference in transmittance between the pattern portion and the pattern opening portion was calculated from these average transmittance values. The L*, a* and b* values of each of the transmitted light through the pattern portion and the transmitted light through the pattern opening portion were calculated using a D65 light source, and the color difference (ΔE) between the transmitted light through the pattern portion and the transmitted light through the pattern opening portion was calculated using the following formula: $\Delta E = \{(\Delta L^*)^2 + (\Delta a^*)^2 + (\Delta b^*)^2\}^{0.5}$ Evaluation of Appearance The sample was placed on a black board in such a manner that the transparent conductive layer faced upward, and whether the pattern portion and the pattern opening portion were visually distinguishable from each other or not was evaluated based on the following criteria: ⊙, the pattern portion and the pattern opening portion were hardly distinguishable from each other; ○, the pattern portion and the pattern opening portion were slightly distinguishable from each other; x, the pattern portion and the pattern opening portion were clearly distinguishable from each other.

TABLE 1

| | Light absorption characteristics | | | | |
|---|---|---|---|---|---|
| | Average absorptance (%) | Standard deviation | Color values | | |
| | | | L* | a* | b* |
| Colored film 1 | 72 | 12.6 | 53.8 | 1.4 | 4.6 |
| Colored film 2 | 57 | 18.2 | 64.6 | 10.6 | 6.8 |
| Colored film 3 | 32 | 20.7 | 84.9 | −13.7 | −16.1 |

TABLE 2

| | Structure | Reflection characteristics | | Transmission characteristics | | Evaluation of appearance |
|---|---|---|---|---|---|---|
| | | Reflectance difference (%) | ΔE | Transmittance difference (%) | ΔE | |
| Example 1 | PET/transparent dielectric layer/ITO/transparent pressure-sensitive adhesive layer/colored film 1 | 0.1 | 0.3 | 0.6 | 1.0 | ⊙ |
| Example 2 | PET/transparent dielectric layer/ITO/transparent pressure-sensitive adhesive layer/colored film 2 | 0.2 | 1.0 | 0.8 | 1.4 | ⊙ |
| Example 3 | PET/ITO/transparent pressure-sensitive adhesive layer/colored film 1 | 0.2 | 0.5 | 0.7 | 1.2 | ⊙ |
| Example 4 | PET/ITO/transparent pressure-sensitive adhesive layer/colored film 2 | 0.4 | 1.1 | 1.1 | 1.5 | ○ |
| Comparative Example 1 | PET/transparent dielectric layer/ITO | 1.8 | 8.5 | 2.6 | 2.2 | X |
| Comparative Example 2 | PET/ITO | 2.6 | 7.8 | 3.1 | 2.3 | X |
| Comparative Example 3 | PET/ITO/transparent pressure-sensitive adhesive layer/colored film 3 | 1.7 | 4.7 | 2.1 | 2.0 | X |
| Comparative Example 4 | PET/transparent dielectric layer/ITO/transparent pressure-sensitive adhesive layer/colored film 3 | 1.3 | 5.0 | 1.8 | 2.0 | X |

Table 2 shows that the transparent conductive films according to the invention have a good appearance even when the transparent conductive layer is patterned.

What is claimed is:

1. A touch panel comprising a transparent conductive film, the transparent conductive film comprising:
   a transparent film substrate;
   a patterned transparent conductive layer formed on one side of the transparent film substrate;
   a transparent dielectric layer provided between the transparent film substrate and the patterned transparent conductive layer;
   a colored layer provided on at least one of an opposite side of the patterned transparent conductive layer from the transparent film substrate and an opposite side of the transparent film substrate from the patterned transparent conductive layer; and
   a pressure-sensitive adhesive layer disposed between the patterned transparent conductive layer and the colored layer when the colored layer is provided on the opposite side of the patterned transparent conductive layer from the transparent film substrate,
   wherein the patterned transparent conductive layer is formed directly on the transparent dielectric layer,
   wherein the colored layer of the transparent conductive film is located on a viewer side,
   wherein the colored layer has an average absorptance of from 35% to 90% for light in the wavelength range of from 380 nm to 780 nm,
   wherein the patterned transparent conductive layer consists essentially of an oxide of at least one metal or semimetal selected from the group consisting of indium, tin, zinc, gallium, antimony, titanium, silicon, zirconium, magnesium, aluminum, gold, silver, copper, palladium, and tungsten,
   wherein the patterned transparent conductive layer has a thickness of 10 to 50 nm, and
   wherein at least one of the colored layer and the patterned transparent conductive layer is an outermost layer of the transparent conductive film.

2. The touch panel of claim 1,
   wherein the absorptance of the colored layer for light in the wavelength range of from 380 nm to 780 nm has a standard deviation of less than 20%.

3. The touch of claim 1,
   wherein the transparent conductive film satisfies the relation n2<n1<n3,
   wherein n1 is the refractive index of the transparent film substrate, n2 is the refractive index of the transparent dielectric layer, and n3 is the refractive index of the patterned transparent conductive layer.

4. The touch panel of claim 1, wherein the transparent film substrate has a thickness of from 2 μm to 200 μm.

5. The touch panel of claim 1, wherein the touch panel is a capacitive touch panel.

6. A touch panel comprising a transparent conductive film, the transparent conductive film comprising:
a transparent film substrate;
a patterned transparent conductive layer formed on one side of the transparent film substrate;
a colored layer provided on an opposite side of the patterned transparent conductive layer from the transparent film substrate; and
a pressure-sensitive adhesive layer disposed between the patterned transparent conductive layer and the colored layer,
wherein the colored layer of the transparent conductive film is located on a viewer side,
wherein the colored layer has an average absorptance of from 35% to 90% for light in the wavelength range of from 380 nm to 780 nm,
wherein the patterned transparent conductive layer consists essentially of an oxide of at least one metal or semimetal selected from the group consisting of indium, tin, zinc, gallium, antimony, titanium, silicon, zirconium, magnesium, aluminum, gold, silver, copper, palladium, and tungsten,
wherein the patterned transparent conductive layer has a thickness of 10 to 50 nm, and
wherein the colored layer is an outermost layer of the transparent conductive film.

7. A touch panel comprising a transparent conductive film, the transparent conductive film comprising:
a transparent film substrate;
a patterned transparent conductive layer formed on one side of the transparent film substrate; and
a colored layer provided on an opposite side of the transparent film substrate from the patterned transparent conductive layer,
wherein the colored layer of the transparent conductive film is located on a viewer side,
wherein the colored layer has an average absorptance of from 35% to 90% for light in the wavelength range of from 380 nm to 780 nm,
wherein the patterned transparent conductive layer consists essentially of an oxide of at least one metal or semimetal selected from the group consisting of indium, tin, zinc, gallium, antimony, titanium, silicon, zirconium, magnesium, aluminum, gold, silver, copper, palladium, and tungsten,
wherein the patterned transparent conductive layer has a thickness of 10 to 50 nm, and
wherein the patterned transparent conductive layer is an outermost layer of the transparent conductive film.

8. The touch panel of claim 7, further comprising a pressure-sensitive adhesive layer disposed between the transparent film substrate and the colored layer.

* * * * *